United States Patent [19]
Mc Crudden

[11] 3,863,036
[45] Jan. 28, 1975

[54] TELEPHONE SUBSCRIBER LOOP GROUND CURRENT DETECTION CIRCUIT

[75] Inventor: John Anthony Mc Crudden, Mississauga, Ontario, Canada

[73] Assignee: Bell-Northern Research Ltd., Ottawa, Ontario, Canada

[22] Filed: Oct. 11, 1973

[21] Appl. No.: 405,445

[52] U.S. Cl........ 179/17 A, 179/6.3 R, 179/18 AD, 179/8.5
[51] Int. Cl.....................H04q 3/74, H04m 17/00
[58] Field of Search...179/18 AD, 18 F, 17 A, 6.3 R, 179/8.5; 340/253 H, 255

[56] References Cited

UNITED STATES PATENTS 3,046,343 7/1962 Cox.............................. 179/17 AX
3,721,768 3/1973 Mazac et al.................. 179/18 AD

*Primary Examiner*—William C. Cooper
*Attorney, Agent, or Firm*—John E. Mowle

[57] ABSTRACT

A circuit for indicating a ground current condition at the subscriber end of an operating loop circuit includes a relay having a plurality of coil windings. Two of the coil windings are inserted in series with the tip and ring leads respectively of the loop circuit to detect a current imbalance between the leads. The coil winding of another relay is also inserted in series with the lead terminating at ground in the associated switching office to detect current flow in excess of a minimum amount. Thus when a ground current condition, within certain limits, is present, operation of both relays provides indication of same.

3 Claims, 2 Drawing Figures

TELEPHONE SUBSCRIBER LOOP GROUND CURRENT DETECTION CIRCUIT

Figure 1:
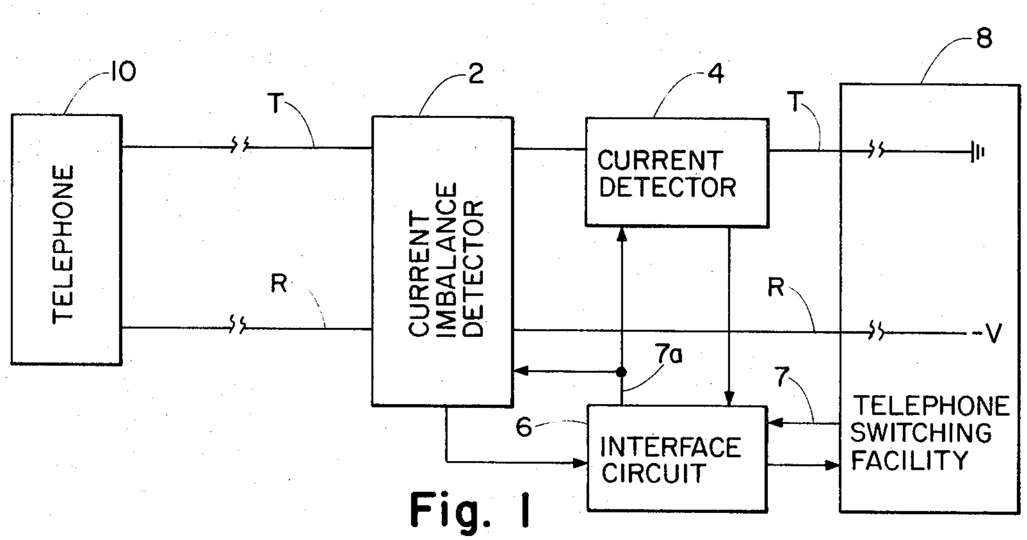

The present invention relates to means for detecting a ground current condition on a telephone subscriber loop circuit associated with a telephone switching facility.

In a telephone system, it is often preferable to be able to distinguish a predetermined condition associated with a particular telephone. For example, in a coin telephone a verification that the required coinage has been deposited by the calling party using the coin telephone is preferable before any two-way conversation between the calling and called parties is permitted. Another example is in the case of a two party subscriber loop circuit where, for the purpose of automatic long distance telephone calls, the two subscriber telephones may be distinguished one from the other and the number of the active telephone identified. This permits the use of automatic billing to the subscriber which has initiated the long distance call, without the intervention of an operator to determine the calling party's telephone number. Distinguishing between one of two telephones on a loop circuit or verification of a minimum required coin deposit at a coin telephone is accomplished by providing a ground current condition at the telephone. This well known method has the effect of causing an imbalance between the currents carried by the tip and ring leads in the associated loop circuit. The lead connected to the battery supply in the associated telephone switching facility carries more current than the lead connected to ground. The ground current condition is typically provided by a make contact in the telephone, which in the case of the two party loop circuit is operated when the telephone is in the off-hook condition, and in the case of the coin telephone is operated when the required coinage is deposited. The make contact connects a resistor in effect between the junction of a pair of resistances, bridging the tip and ring leads, and ground.

Prior methods and apparatus for detecting a ground current condition, on a loop circuit, require the removal of office ground and battery from the tip and ring leads. Appropriate detection circuitry is then connected, the ground and battery reconnected and the presence or absence, as the case may be, of a ground condition determined. Thereafter, the ground and battery are removed, the detection circuitry disconnected, and the ground and battery reconnected, so that the loop circuit is restored to normal operation. This sequence of operation may vary from one apparatus to another, however there is typically at least one removal and reconnection of the office ground and battery. Hence disturbances are introduced on the loop circuit which are audible to the telephone user as clicks or thumps. These disturbances must also be allowed to pass or settle before a reliable indication of the ground condition state of the loop circuit can be obtained from the detection circuitry. Consequently the whole series of operations may consume as much as a full second of off-hook time before the loop circuit is restored to normal operation. Normally in dial pulse operation a dial pulse originating register in a common control switching office is occupied for an average of about 10 seconds in a telephone call. In the case of telephone calls requiring ground current detection, i.e. for the identification of one of two phones on a party line or verification of coin deposits at a coin operated telephone, the originating register will be occupied for as much as one second more, that is 10 percent longer. Depending upon the number of loop circuits which require ground condition detection, additional originating register circuits may be required to maintain a minimum standard of service to the telephone subscribers served by the switching office.

The present invention provides an apparatus which detects a ground current condition on a subscriber loop circuit, and provides an indication of such detection when the ground current condition is within certain predetermined limits. The operation of the apparatus continuously maintains the battery supply and ground connections to the associated subscriber loop circuit, thereby substantially avoiding the generation of audible noises during operation of said detection apparatus and substantially reducing the time required for circuit operation. As the detection is within said predetermined limits, deliberate connection of the tip or ring leads to ground cannot function to provide an erroneous indication of a proper ground current condition.

The present invention is a circuit for indicating a ground current condition on an operating subscriber loop circuit associated with a telephone switching facility. The circuit comprises a first means for detecting a current flow imbalance, of at least a predetermined magnitude between the tip and ring leads of the loop circuit. A second means detects a current flow of at least a predetermined magnitude in the lead of the loop circuit terminating at a ground connection in the switching facility. Detection by the first and second means indicates a ground current within predetermined limits, while detection by the first means alone occurs when said ground current exceeds the greater of said predetermined limits.

Figure 2:
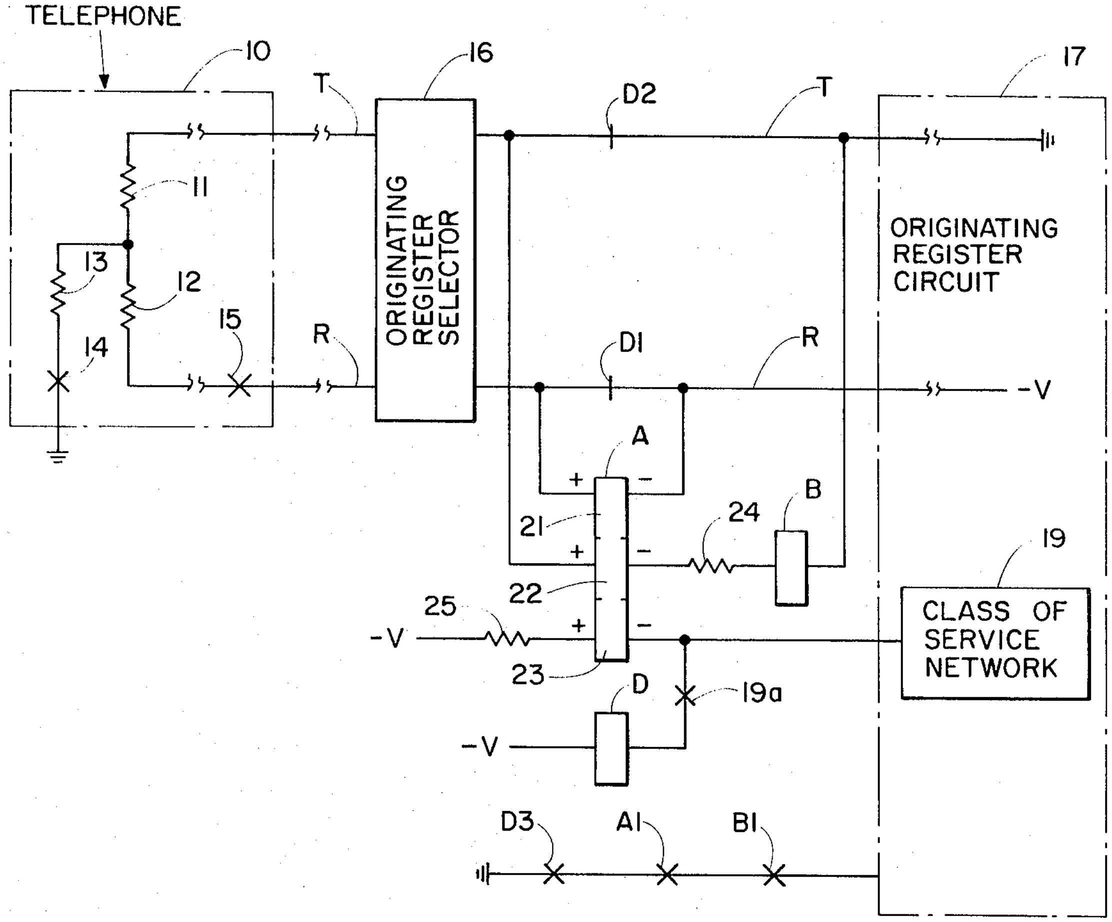

An example embodiment is described in the following with reference to the accompanying drawings in which:

FIG. 1 is a block diagram of a telephone ground current detection circuit in accordance with the invention; and FIG. 2 is a more detailed block and schematic drawing of the circuit in FIG. 1.

Referring to FIG. 1, a subscriber loop circuit having tip and ring leads, T and R, extends from a telephone 10 to a current imbalance detector 2. The ring lead R extends through the detector 2 to a battery supply -V in a telephone switching facility 8. The tip lead T extends through the current imbalance detector 2, through a current detector 4 and to ground in the switching facility 8. An output lead from each detector, 2 and 4, is connected to an interface circuit 6, the output of which is connected to the switching facility 8. A control lead 7 is connected from the switching facility 8 to the interface circuit 6 and another control lead 7*a* extends from the interface circuit 6 to the detectors 2 and 4. The tip and ring leads, T and R, are each shown broken at two different places to denote long line length and/or other circuitry not directly related to the structure and operation of the ground current detection circuit.

In FIG. 2 the telephone 10 includes a switch hook contact 15 and series resistances 11 and 12, representing internal circuitry, bridging the tip and ring leads, T and R. A make contact 14 in the telephone 10 is connected in series with a resistor 13, between ground and the junction between the resistances 11 and 12. The leads T and R extend to ground and battery connections in an originating register circuit 17 via break contacts D2 and D1 respectively and in series with an originating register selector 16.

The make contact 14 is associated with the switch hook in the telephone 10 when the telephone 10 is intended for use in conjunction with a two party line. In the case of the telephone 10 being a coin operated telephone the contact 14 is associated with the coin deposit apparatus included therein.

The current imbalance detector 2 in FIG. 1 is provided in FIG. 2 by a relay A. The relay A includes first, second and third coils 21, 22 and 23 respectively. Each of the coils are marked positive (+) at one end and negative (−) at the other end to denote the winding direction. The first coil 21 is connected across the break contact D1 with the positive end remote from the battery supply -V. The positive end of the second coil 22 is connected at the side of the break contact D2, remote from ground. The positive end of the third coil 23 is connected via a resistor 25 to the battery supply -V.

The current detector 4 in FIG. 1 is provided by a relay B in FIG. 2. One end of the coil of the relay B is connected between the side of the break contact D2 adjacent the ground connection in the originating register circuit. The other end of the coil of relay B is connected to the negative end of the second coil 22, via a resistor 24.

The interface circuit 6 in FIG. 1 is provided in FIG. 2 by a relay D and its associated contacts along with make contacts A1 and B1 of the relays A and B respectively. The originating register circuit 17 in FIG. 2 is included in the telephone switching facility 8 in FIG. 1. A class of service network 19, in the originating register circuit 17, is connected to the negative end of the third coil 23 and via a make contact 19a, associated with the network 19, to one end of the coil of the relay D. The other end of the coil of the relay D is connected to the battery supply -V. The relay D includes the break contacts D1 to D2 and a make contact D3. The make contacts A1, B1 and D3 are connected in series between ground and the originating register circuit 17.

In operation, referring to FIG. 1, during the progress of a telephone call, the switching facility 8 may require a determination of the presence or absence of a ground current condition according to the class of service assigned to the subscriber's telephone 10. If so, the telephone switching facility enables the interface circuit 6 and the detectors 2 and 4 via control leads 7 and 7*a*. If the detector 2 detects a current imbalance of greater than a predetermined magnitude between the tip and ring leads T and R, an indication of such is received by the interface circuit 7. If the detector 4 detects a current in the tip lead T of a magnitude greater than a predetermined minimum magnitude an indication of such is also received by the interface circuit. The coincidence of an enabling signal from the switching facility 8 and detection by the detectors 2 and 4 causes the interface circuit to indicate a valid ground current condition at the subscriber end of the subscriber loop circuit.

In reference to FIG. 2 briefly, the absence of a ground current condition will cause relay B to operate but relay A will not operate, as the balanced tip and ring currents have a cancelling field effect between the coils 21 and 22. The other extreme case is when an unauthorized ground is introduced at the telephone side of the contacts D1 and D2, as sometimes occurs with coin operated telephones. The current imbalance between the tip and ring leads will cause the A relay to operate but the B relay will not operate as the tip lead in the switching office will be carrying little or no current. A valid ground current condition is detected when both relays A and B are operated. When contact 14 is closed the current conducted by the resistor 13 is sufficient to cause an adequate imbalance of tip and ring currents and the relay A operates. The current conducted by the resistor 13 is not great enough to reduce the tip lead current to less than that required to operate the relay B, and the relay B operates.

Now in more detail, when a subscriber demands service by placing the telephone 10 in an off-hook condition, completing the loop circuit via switch hook contact 15, the contact 14 conducts a portion of the loop current on the ring lead R to ground causing a ground current condition. The originating register selector 16 responds to the loop current by terminating the subscriber loop circuit at an available originating register 17. At any time during connection to the originating register circuit 17 the class of service network 19 may cause operation of the D relay to check for a ground current condition. The relay D is caused to operate by a ground applied thereto via the class of service network 19 which actuates the make contact 19*a*. At the same time a reverse bias current is caused to flow through the third coil 23 in the relay A. The break contacts D1 and D2 open with the operation of the relay D, causing the current carried by the ring lead R to flow through the first coil 21 and the current carried by the tip lead T to flow through coil 22 and the coil of relay B. Resistors 24 and 25 provide some reduction in current flow. It will be noted from FIG. 2 that the magnetic fields generated by the currents in the second and third coils 22 and 23 oppose the magnetic field generated by the current in the first coil 21.

The values of the resistors 11, 12 and 13 are such that the effect of the current in the first coil 21 is great enough to more than overcome the combined effects of the currents in the second and third coils 22 and 23, and the relay A operates. At the same time the current in the second coil 22 and hence current in the coil of relay B is in excess of the operate current for the relay B, and relay B also operates. Thus a connection is established through the make contacts D3, A1 and B1 providing an indication, to the originating register circuit 17, of a valid ground current condition. If the relay A fails to operate there is not a sufficient current imbalance to indicate a ground current condition. If relay B fails to operate in the presence of operation by the relay A there is an excessive and invalid ground current condition as may be caused by the deliberate connection of the tip or ring leads to ground, somewhere between the switching facility and the telephone 10.

When the circuit in FIG. 2 is constructed using typically available telephone switching relays, the average time required to operate the D relay and derive an indication of a ground current condition is usually less than 30 milliseconds. Hence after dialling is completed the indication of the presence or absence of a ground current condition can be provided in a period of time less than and running concurrent with the time required to connect the originated register 17 with the associated common control switching equipment, for example the marker in a crossbar switching office.

The detailed example embodiment in FIG. 2 has been shown in combination with the originating register of a common control electromechanical switching office. However it will be obvious to one skilled in the art that with minor modification it could well be adapted to operate in conjunction with an electronic switching office to provide the same function and indication.

What is claimed is:

1. A circuit for indicating a ground current condition at the subscriber's end of an operating telephone subscriber's loop circuit terminated at battery and ground connections in a telephone switching facility, said indication being provided to the telephone switching facility, the circuit comprising:

first means for detecting a current flow imbalance of at least a predetermined magnitude between tip and ring leads of the loop circuit, the detection indicating a ground current condition in said loop circuit exceeding a first limit;

second means for detecting a current flow of at least a predetermined magnitude in the end of the loop circuit terminated at the ground connection, absence of detection by the second means in the presence of detection by the first means indicating a ground current condition in said loop circuit exceeding a second limit greater than the first limit.

2. A circuit as defined in claim 1 in which said indication is provided via an interface circuit to said telephone switching facility, the interface circuit comprising:

enable means, responsive to control from the switching facility, for directing current carried by the loop circuit through said first and second means.

3. A circuit for indicating a ground current condition at the subscriber's end of an operating telephone subscriber's loop circuit, the subscriber's loop circuit being terminated at battery and ground connections by an originating register circuit in a common control switching facility associated with the loop circuit, the circuit comprising:

switch means controllable by the originating register circuit for interrupting tip and ring leads of the loop circuit, a first relay having first and second coils shunting the switch means in the tip and ring leads respectively, the relay being so connected that normal currents in the tip and ring leads cause a field cancelling effect between the first and second coils, a second relay having a coil in series between the second coil and the lead in the loop circuit terminated at said ground connection, first and second relay contacts actuated by said first and second relays respectively, said relay contacts connected to the originating register to provide said indication.

* * * * *